United States Patent
Seiden et al.

(10) Patent No.: US 11,281,672 B2
(45) Date of Patent: Mar. 22, 2022

(54) JOIN KEY PROPAGATION

(71) Applicant: SIGMA COMPUTING, INC., San Francisco, CA (US)

(72) Inventors: Max H. Seiden, San Francisco, CA (US); Jason D. Frantz, San Francisco, CA (US)

(73) Assignee: SIGMA COMPUTING, INC., San Francisco, CA (US)

( * ) Notice: Subject to any disclaimer, the term of this patent is extended or adjusted under 35 U.S.C. 154(b) by 57 days.

(21) Appl. No.: 16/822,241

(22) Filed: Mar. 18, 2020

(65) Prior Publication Data

US 2020/0301918 A1 Sep. 24, 2020

Related U.S. Application Data

(60) Provisional application No. 62/820,333, filed on Mar. 19, 2019.

(51) Int. Cl.
| | |
|---|---|
| *G06F 16/00* | (2019.01) |
| *G06F 16/2455* | (2019.01) |
| *G06F 16/908* | (2019.01) |
| *G06F 16/903* | (2019.01) |

(52) U.S. Cl.
CPC ........ *G06F 16/2456* (2019.01); *G06F 16/908* (2019.01); *G06F 16/90335* (2019.01)

(58) Field of Classification Search
CPC .......... G06F 16/2456; G06F 16/90335; G06F 16/908
See application file for complete search history.

(56) References Cited

U.S. PATENT DOCUMENTS

| | | | |
|---|---|---|---|
| 2008/0016041 A1* | 1/2008 | Frost | G06F 16/258 |
| 2008/0140696 A1* | 6/2008 | Mathuria | G06F 16/221 |
| 2015/0026153 A1* | 1/2015 | Gupta | G06F 16/3329 707/711 |
| 2020/0125559 A1* | 4/2020 | Talbot | G06F 16/289 |

* cited by examiner

*Primary Examiner* — Diedra McQuitery

(57) ABSTRACT

Join key propagation including receiving a request to generate a referencing worksheet linked from a data source worksheet, wherein the data source worksheet is a presentation of a data set organized in columns from two data source tables joined using a join key, and wherein the referencing worksheet presents at least a subset of the data set presented by the data source worksheet; retrieving data source worksheet metadata and the join key using a reference to the data source worksheet metadata in the request; determining an additional column from the two data source tables to add to the referencing worksheet, wherein the additional column is excluded from the data source worksheet; and creating, using the data source worksheet metadata and the join key, the referencing worksheet presenting the columns from the two data source tables with the additional column.

20 Claims, 7 Drawing Sheets

JOIN KEY PROPAGATION

CROSS-REFERENCE TO RELATED APPLICATIONS

This application is a non-provisional application for patent entitled to a filing date and claiming the benefit of earlier-filed U.S. Provisional Patent Application Ser. No. 62/820,333, filed Mar. 19, 2019.

BACKGROUND

FIELD OF THE INVENTION

The field of the invention is data processing, or, more specifically, methods, apparatus, and products for join key propagation.

DESCRIPTION OF RELATED ART

Modern businesses may store large amounts of data in remote databases within cloud-based data warehouses. This data may be accessed using database query languages, such as structured query language (SQL). Few users, however, are able to fully utilize all information stored in the database. Further, manipulating the data stored in the database may require administrative access.

SUMMARY

Methods, systems, and apparatus for join key propagation. Join key propagation includes receiving a request to generate a referencing worksheet linked from a data source worksheet, wherein the data source worksheet is a presentation of a data set organized in columns from two data source tables joined using a join key, and wherein the referencing worksheet presents at least a subset of the data set presented by the data source worksheet; retrieving data source worksheet metadata and the join key using a reference to the data source worksheet metadata in the request; determining an additional column from the two data source tables to add to the referencing worksheet, wherein the additional column is excluded from the data source worksheet; and creating, using the data source worksheet metadata and the join key, the referencing worksheet presenting the columns from the two data source tables with the additional column, wherein creating the referencing worksheet comprises: generating a database query using the data source worksheet metadata, referencing worksheet metadata received in the request, and the join key; and issuing the database query to the database.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
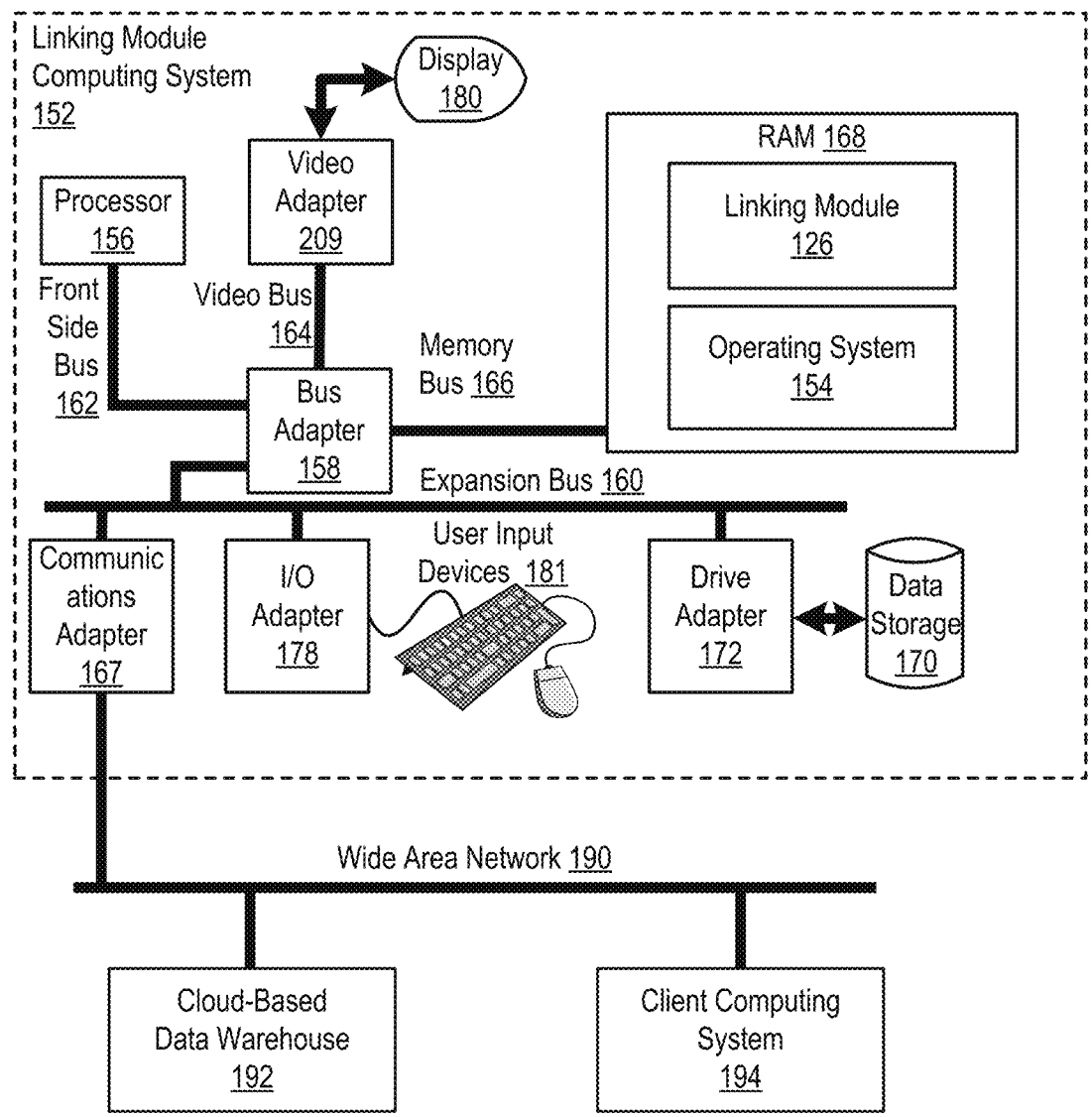
FIG. 1 sets forth a block diagram of an example system configured for join key propagation according to embodiments of the present invention.

Exemplary methods, apparatus, and products for join key propagation in accordance with the present invention are described with reference to the accompanying drawings, beginning with FIG. 1. FIG. 1 sets forth a block diagram of automated computing machinery comprising an exemplary linking module computing system (152) configured for join key propagation according to embodiments of the present invention. The linking module computing system (152) of FIG. 1 includes at least one computer processor (156) or 'CPU' as well as random access memory (168) ('RAM') which is connected through a high speed memory bus (166) and bus adapter (158) to processor (156) and to other components of the linking module computing system (152).

Stored in RAM (168) is an operating system (154). Operating systems useful in computers configured for join key propagation according to embodiments of the present invention include UNIX™, Linux™, Microsoft Windows™, AIX™, IBM's i OS™, and others as will occur to those of skill in the art. The operating system (154) in the example of FIG. 1 is shown in RAM (168), but many components of such software typically are stored in non-volatile memory also, such as, for example, on data storage (170), such as a disk drive. Also stored in RAM is the linking module (126), a module for join key propagation according to embodiments of the present invention.

The linking module computing system (152) of FIG. 1 includes disk drive adapter (172) coupled through expansion bus (160) and bus adapter (158) to processor (156) and other components of the linking module computing system (152). Disk drive adapter (172) connects non-volatile data storage to the linking module computing system (152) in the form of data storage (170). Disk drive adapters useful in computers configured for join key propagation according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example linking module computing system (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example linking module computing system (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary linking module computing system (152) of FIG. 1 includes a communications adapter (167) for data communications with other computers and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for join key propagation according to embodiments of the present invention include modems for wired dial-up communications, Ethernet (IEEE 802.3) adapters for wired data communications, and 802.11 adapters for wireless data communications.

The communications adapter (167) is communicatively coupled to a wide area network (190) that also includes a cloud-based data warehouse (192) and a client system (194). The cloud-based data warehouse (192) is a computing system or group of computing systems that hosts a database for access over the wide area network (190). The client system (194) is a computing system that accesses the database using the linking module (126) on the linking module computing system (152).

Figure 2:
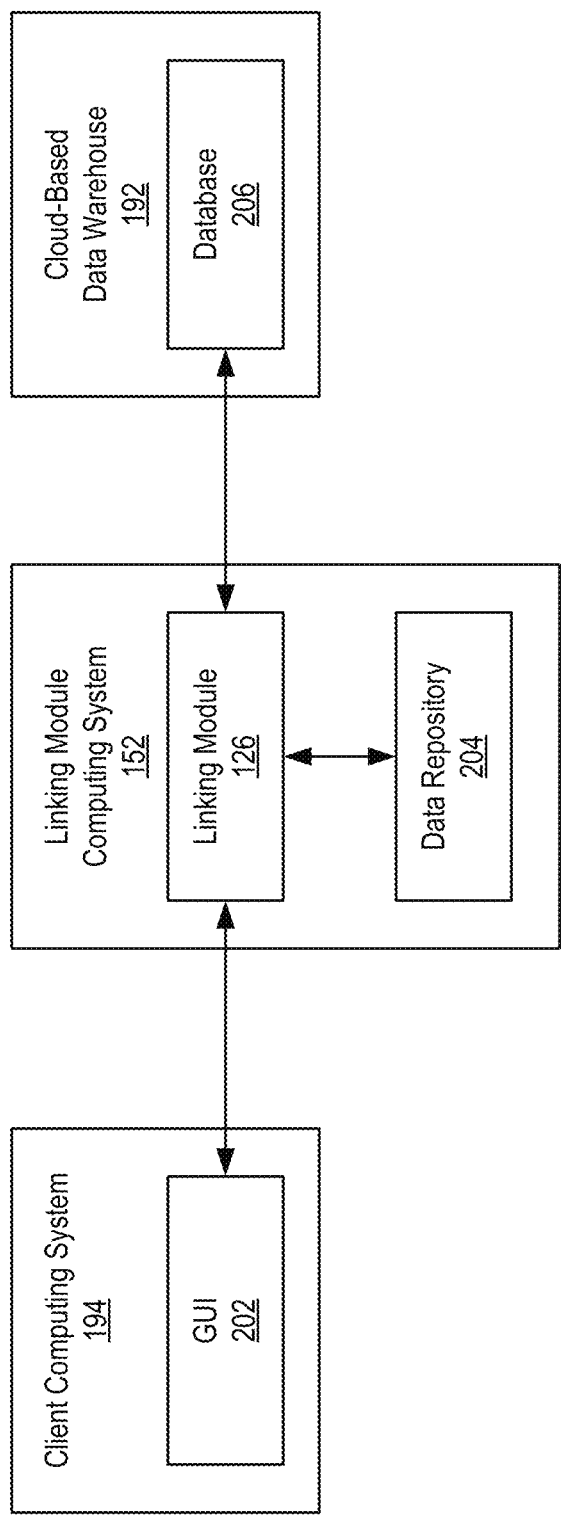
FIG. 2 sets forth a block diagram of an example system configured for join key propagation according to embodiments of the present invention.

FIG. 2 shows an exemplary block diagram of a system for join key propagation according to embodiments of the present invention. As shown in FIG. 2, the system includes a client computing system (194), a linking module computing system (152), and a cloud-based data warehouse. The client computing system (194) includes a graphical user interface (GUI) (202). The linking module computing system (152) includes a linking module (126) and a data repository (204). The cloud-based data warehouse (192) includes a database (206).

The GUI (202) is a user interface that presents a data set and graphical elements to a user and receives user input from the user. The GUI (202) may be presented, in part, by the linking module (126) and displayed on a client computing system (194) (e.g., on a system display or mobile touch-screen). The GUI (202) may be an Internet application hosted on the linking module computing system (152) and presented on the client computing system (194).

The GUI (202) presents, in part, worksheets to a user. A worksheet is a presentation of a data set from a database (206). A referencing worksheet is a worksheet that is linked from another worksheet (referred to as a data source worksheet). The referencing worksheet inherits the data set presented in the data source worksheet (i.e., data not excluded from presentation in the data source worksheet). The referencing worksheet may also inherit the results of formulas applied to other data but not the formulas themselves. The referencing worksheet may be limited to the data set presented or otherwise made available in the data source worksheet unless the user generating the referencing worksheet has permission to access excluded data in the database. A referencing worksheet may be linked from any number of data sources, including multiple data source worksheets. Changes made to the data source worksheet are reflected in the referencing worksheet. For example, if a column is added to and presented in the data source worksheet, the column would then appear in or be available to the referencing worksheet.

A worksheet may include columns and rows from one or more tables in the database (206). Further, a worksheet may include columns from different tables joined together using a join key. A join key is a link between one row in a first column (i.e., a value) and another row in a second column or group of columns. A join key may be set using matching values from two columns in different tables or may be set by associating values in one column in one table with different values in another column in a different table. The manner in which a join key connects two columns of data is referred to as the join pattern. The join key may be stored in the data repository (204) on the linking module computing system (152).

The join key may be defined during the generation of the data source worksheet. Defining a join key may include receiving (e.g., from a user or creator of the data source worksheet) a selection of a value (e.g., data at the intersection of a column and row) from one table in a database and a selection of a row from a second table in the database. The linking module (126) creates a link between the value and row and stores that link as part of a join key between the two tables. A join key may include multiple links between values and rows. The data source worksheet joining the two tables may exclude from presentation any columns in either table, including the column that includes a value selected for the join key, without altering the join key.

After the join key is defined for the data source worksheet, the linking module (126) maintains the join key for the data source worksheet (e.g., in the data repository (204)) and may provide the join key for use in creating referencing worksheets. By propagating the join key from the data source worksheet to the referencing worksheets, a referencing worksheet may join other columns not presented in the data source worksheet using the same join pattern as the data source worksheet.

A join key differs from a foreign key used in databases to create relationships between tables. Specifically, while a foreign key is defined within a database (206) to create a relationship between two tables, a join key is defined outside of the database (206) (e.g., on the linking module computing system (152)). Join keys can create relationships between tables not contemplated by the database, and can be implemented in join patterns not contemplated by the database.

The GUI (202) presents a worksheet using the information in the worksheet metadata. Worksheet metadata, such as referencing worksheet metadata and data source metadata, is data that describes a worksheet. Specifically, the worksheet metadata may include a description of the data set, the formulas to be applied to the data set, and the presentation structure of the data set.

The description of the data set describes which data is to be requested via the database query. The description of the data set may include which columns and rows of data are to be retrieved from the database (206) via the database query. The formulas to be applied to the data set may include the manipulations of the data in the columns and rows received in the data set. Such manipulations may include calculation columns that apply a formula to data in the data set.

The presentation structure of the data set may include presentation selections made by a user. The presentation structure may include the hierarchical relationship between the columns, filters applied to the data, and the manner in which the data is sorted. The presentation structure of the data set may also include the GUI visibility of particular data within the data set. GUI visibility may be altered based on filter settings of the data or on the visibility status (e.g., hidden or not hidden) of a column within the data set. The presentation structure of the data set may also include the formatting of the worksheet, such as the size of rows and columns.

Worksheet metadata may also include a reference to, or identifier of, the worksheet metadata for a different worksheet. For example, the worksheet metadata for a referencing worksheet may include a reference to the data source worksheet from which the referencing worksheet was linked. Further, referencing worksheet metadata may lack a reference to the database or data set upon which the data source worksheet was built. Rather, the referencing worksheet metadata may only include a reference to the data source worksheet metadata, and that reference is used to retrieve the data source worksheet metadata. Because the referencing worksheet metadata may lack a reference to the database or data set, both the referencing worksheet metadata and data source worksheet metadata are used to generate the database query.

The linking module (126) is hardware, software, or an aggregation of hardware and software configured to retrieve worksheet metadata, evaluate worksheet metadata, and generate a database query using the worksheet metadata. The linking module (126) may be part of a database query generator that generates the database query. The database query may be populated based on the worksheet metadata.

The data repository (204) is a repository of worksheet metadata and join keys. Worksheet metadata may be retrieved from the data repository (204) using a reference to, or identifier of, the worksheet metadata. Join keys may be stored with the worksheet metadata for the worksheets utilizing the join key. Alternatively, join keys may be stored elsewhere in the data repository (204) and retrievable using an identifier of the join key or associated worksheet metadata.

The database (206) is a collection of data and a management system for the data. The management system may receive database queries, such as structure query language (SQL) queries, and respond to queries with a data set.

Figure 3:
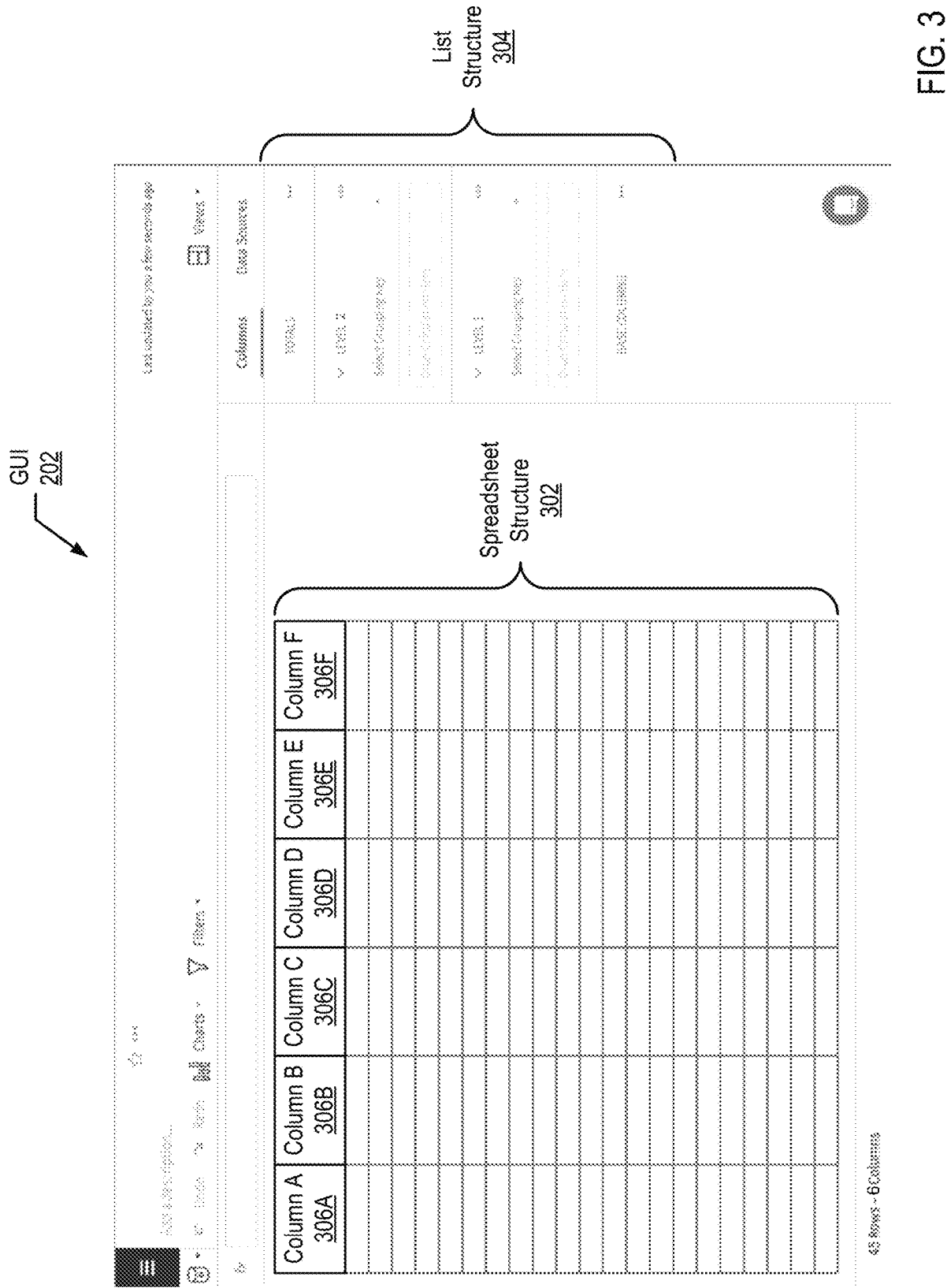
FIG. 3 sets forth a block diagram of an example system configured for join key propagation according to embodiments of the present invention.

FIG. 3 shows an exemplary graphical user interface (GUI) for join key propagation according to embodiments of the present invention. As shown in FIG. 3, the exemplary GUI (202) includes a spreadsheet structure (302) and a list structure (304). The spreadsheet structure (302) includes a data set (shown as empty rows) with six columns (column A (306A), column B (306B), column C (306C), column D (306D), column E (306E), column F (306F)).

The spreadsheet structure (302) is a graphical element and organizing mechanism for the data set. The spreadsheet structure (302) displays the data within the data set as rows of data organized by columns (column A (306A), column B (306B), column C (306C), column D (306D), column E (306E), column F (306F)). The columns delineate different categories of the data in each row of the data set. The columns may also be calculations using other columns in the data set.

The list structure (304) is a graphical element used to define and organize the hierarchical relationships between the columns (column A (306A), column B (306B), column C (306C), column D (306D), column E (306E), column F (306F)) of the data set. The term "hierarchical relationship" refers to subordinate and superior groupings of columns. For example, a database may include rows for an address book, and columns for state, county, city, and street. A data set from the database may be grouped first by state, then by county, and then by city. Accordingly, the state column would be at the highest level in the hierarchical relationship, the county column would be in the second level in the hierarchical relationship, and the city column would be at the lowest level in the hierarchical relationship.

The list structure (304) presents a dimensional hierarchy to the user. Specifically, the list structure (304) presents levels arranged hierarchically across at least one dimension. Each level within the list structure (304) is a position within a hierarchical relationship between columns (column A (306A), column B (306B), column C (306C), column D (306D), column E (306E), column F (306F)). The keys within the list structure (304) identify the one or more columns that are the participants in the hierarchical relationship. Each level may have more than one key.

One of the levels in the list structure (304) may be a base level. Columns selected for the base level provide data at the finest granularity. One of the levels in the list structure (304) may be a totals or root level. Columns selected for the totals level provide data at the highest granular level. For example, the totals level may include a field that calculates the sum of each row within a single column of the entire data set (i.e., not partitioned by any other column).

The GUI (202) may enable a user to drag and drop columns (column A (306A), column B (306B), column C (306C), column D (306D), column E (306E), column F (306F)) into the list structure (304). The order of the list structure (304) may specify the hierarchy of the columns relative to one another. A user may be able to drag and drop the columns in the list structure (304) at any time to redefine the hierarchical relationship between columns. The hierarchical relationship defined using the columns selected as keys in the list structure (304) may be utilized in charts such that drilling down (e.g., double click on a bar), enables a new chart to be generated based on a level lower in the hierarchy.

Figure 4:
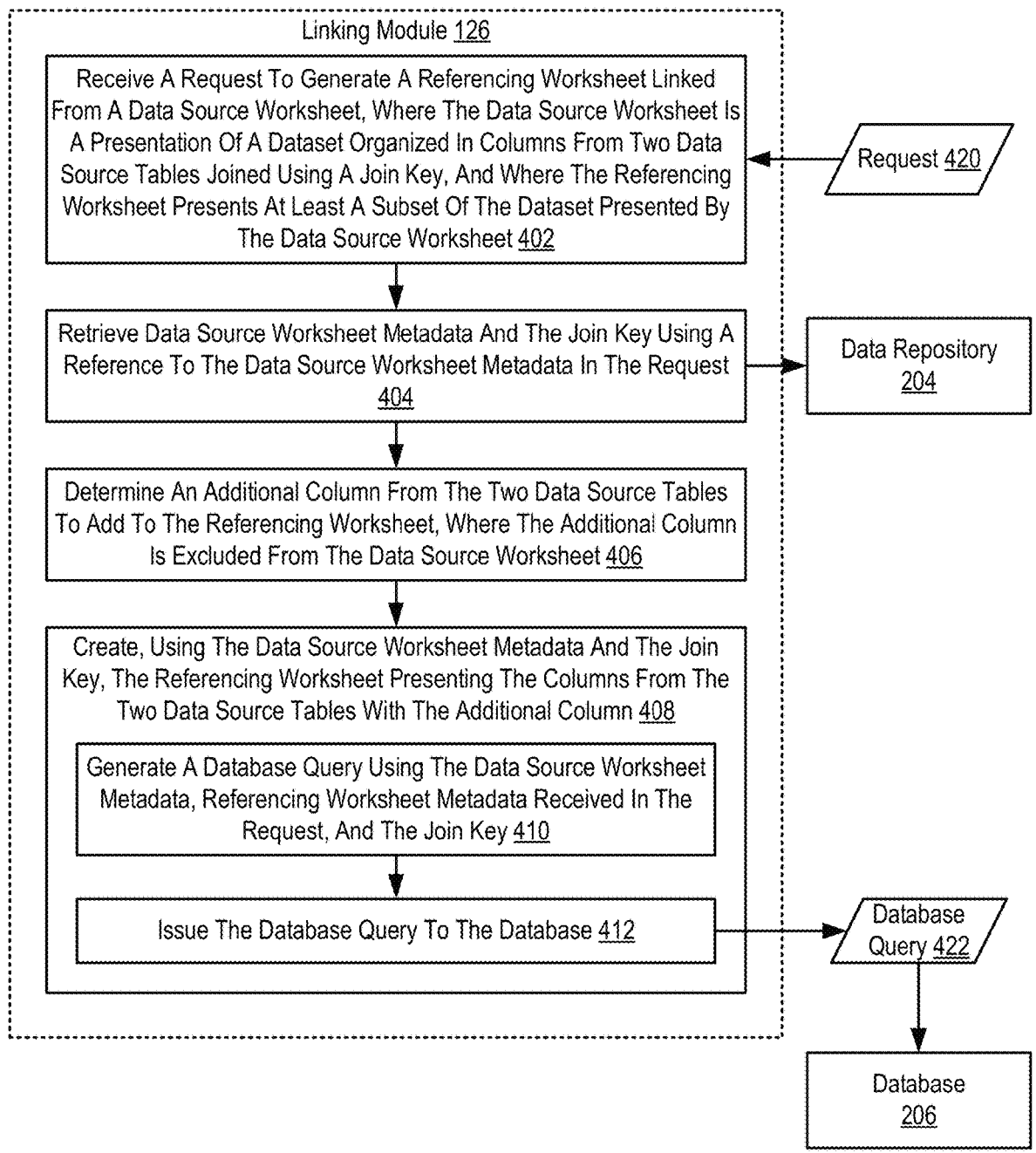
FIG. 4 sets forth a flow chart illustrating an exemplary method for join key propagation according to embodiments of the present invention.

For further explanation, FIG. 4 sets forth a flow chart illustrating an exemplary method for join key propagation according to embodiments of the present invention that includes receiving (402) a request (420) to generate a referencing worksheet linked from a data source worksheet, wherein the data source worksheet is a presentation of a data set organized in columns from two data source tables joined using a join key, and wherein the referencing worksheet presents at least a subset of the data set presented by the data source worksheet. Receiving (402) a request (420) to generate a referencing worksheet linked from a data source worksheet, wherein the data source worksheet is a presentation of a data set organized in columns from two data source tables joined using a join key, and wherein the referencing worksheet presents at least a subset of the data set presented by the data source worksheet may be carried out by the linking module (126) receiving the request (420) from a user to generate the referencing worksheet using a data source worksheet. The referencing worksheet metadata may be generated and populated using the contents of request (420). The data source worksheet may include any number of data sources, including more than two tables from the database.

The request (420) may include a reference to the data source worksheet and a selection of columns from the data source worksheet. The request may include a selection of all columns to present the entire data set from the data source worksheet. Alternatively, the request may include a selection of fewer than all columns to present a subset of the data set from the data source worksheet. The columns selected may be from more than one data source table and combined using the join key. The request (420) may include other selections from the data source worksheet, such as an indication as to whether the referencing worksheet is to inherit the presentation structure of the data source worksheet (i.e., formatting).

The data source worksheet itself may exclude values used in the join key. Specifically, if the values in one column are those selected in the join key to join columns from different tables, those specific values need not be presented in the data source worksheet to maintain the join pattern between the columns. Regardless of whether the data source worksheet excludes values used in the join key, the join key may be propagated and made available for use in creating a referencing worksheet linked from the data source worksheet.

The method of FIG. 4 further includes retrieving (404) data source worksheet metadata and the join key using a reference to the data source worksheet metadata in the request. Retrieving (404) data source worksheet metadata and the join key using a reference to the data source worksheet metadata in the request may be carried out by the linking module (126) parsing the request for the reference to the data source worksheet metadata and the join key and then retrieving the data source worksheet metadata and join key from a data repository (204) using the reference.

Join keys are stored in a location accessible by the linking module (126), separate and distinct from the database (206). By storing the join keys for data source worksheets in a location accessible by the linking module (126), the manner in which two or more tables from the database have been joined together may be preserved regardless of whether the values from the data source worksheet used in the join key are available or visible to the referencing worksheet.

The method of FIG. 4 further includes determining (406) an additional column from the two data source tables to add to the referencing worksheet, wherein the additional column is excluded from the data source worksheet. Determining (406) an additional column from the two data source tables to add to the referencing worksheet, wherein the additional column is excluded from the data source worksheet may be carried out by the linking module (126) accessing the at least one of the two tables from the database and retrieving a list of columns excluded from the data source worksheet. The additional column is selected from the list of columns excluded from the data source worksheet.

The method of FIG. 4 further includes creating (408), using the data source worksheet metadata and the join key, the referencing worksheet presenting the columns from the two data source tables with the additional column. Creating (408), using the data source worksheet metadata and the join key, the referencing worksheet presenting the columns from the two data source tables with the additional column includes generating (410) a database query (422) using the data source worksheet metadata, referencing worksheet metadata received in the request, and the join key; and issuing (412) the database query (422) to the database (206). The request (420) may indicate that the referencing worksheet should display the entire data set presented in the data source worksheet or a subset of the data set.

Generating (410) a database query (422) using the data source worksheet metadata, referencing worksheet metadata received in the request, and the join key may be carried out by the linking module (126) creating the database query (422) to retrieve the columns of the tables joined together using the join key. The database query (422) may be an SQL statement. Issuing (412) the database query (422) to the database (206) may be carried out by the linking module (126) sending the generated database query (422) over a wide area network to the database (206) on the cloud-based data warehouse (192).

Consider the following example. A sales manager at a company may create a data source worksheet using a table that tracks sales made to companies and a table that contains information about the companies. The sales made table may include columns for unit ID, units purchased, date of purchase, total for the sale, and the purchaser ID. The company information table may include columns for company name, company address, contact person at the company, and a contact phone number for the contact person. The sales manager may create a data source worksheet to present a combination of the two tables that shows the units purchased, total for the sale, the purchaser ID, the company name, the contact person, and contact phone number. In creating the data source worksheet, the sales manager defines a join key that links the purchaser ID to the company name. Once the data source worksheet is generated, the sales manager may hide the purchaser ID column as the purchaser ID column may be irrelevant to the sales managers requirements for the data source worksheet.

Continuing with the example, assume that the linking module (126) receives a request from a warranty associate working under the sales manager to create a referencing worksheet linked from the sales manager's data source worksheet. The warranty associate wants to create a referencing worksheet that tracks which items were sold and whom at the company to contact regarding warranty matters. The linking module (126) retrieves the data source metadata and join key from the data repository for the sales manager's data source worksheet.

Continuing with the example, the linking module (126) then determines additional columns from the sales made table and the company information table to add to the warranty associate's referencing worksheet. This may include presenting, to the warranty associate, a list of the columns presented in the data source worksheet (units purchased, total for the sale, the company name, the contact person, and contact phone number) and a list of columns from the sales made table and the company information table that were excluded from the data source worksheet (unit ID, date of purchase, and company address). In order to generate the list of columns from the sales made table and the company information table that were excluded from the data source worksheet, the linking module (126) may access the tables in the database to retrieve the list of columns from each table.

From the list presented, the warranty associate may select units purchased, the contact person, and contact phone number from the data source worksheet, and unit ID and date of purchase as additional columns to include that were excluded from the data source worksheet. The linking module (126) then creates the referencing worksheet from the columns selected by the warranty associate and joins the units purchased, unit ID, and date of purchase columns to the contact person and contact phone number columns using the join key, even though the join key uses the purchaser ID value that was hidden in the referencing worksheet.

The above-described limitations improve the operation of the computer system by propagating join keys from a data source worksheet to a referencing worksheet, enabling referencing worksheet creators to use previously generated join keys regardless of whether the values from the data source worksheet used in the join key are available or visible to the referencing worksheet. This is accomplished by retrieving the stored join keys, determining additional columns to join in the referencing worksheet using the join key, and creating the worksheet using the additional columns joined using the join key.

Figure 5:
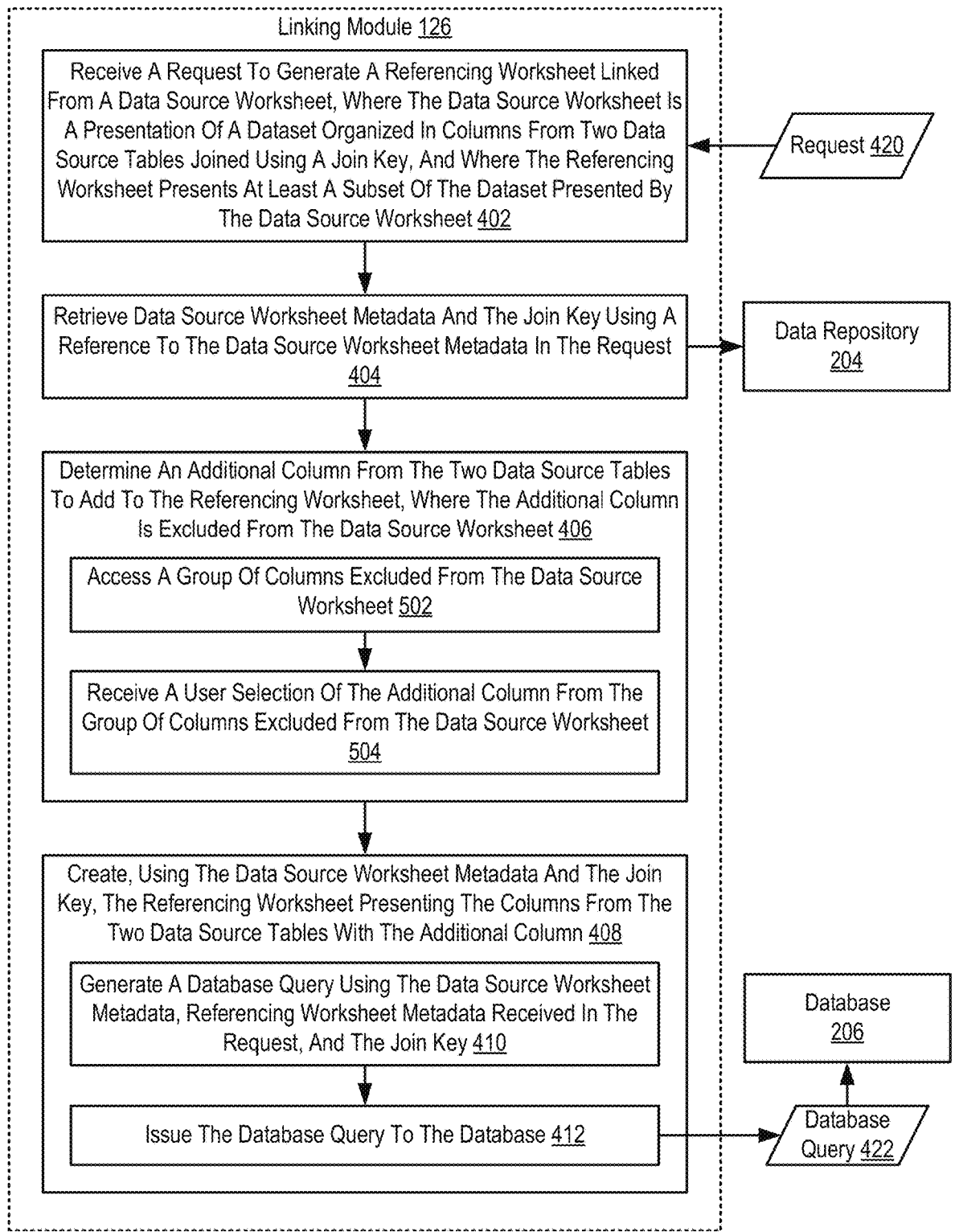
FIG. 5 sets forth a flow chart illustrating an exemplary method for join key propagation according to embodiments of the present invention.

For further explanation, FIG. 5 sets forth a flow chart illustrating a further exemplary method for join key propagation according to embodiments of the present invention that includes receiving (402) a request (420) to generate a referencing worksheet linked from a data source worksheet, wherein the data source worksheet is a presentation of a data set organized in columns from two data source tables joined using a join key, and wherein the referencing worksheet presents at least a subset of the data set presented by the data source worksheet; retrieving (404) data source worksheet metadata and the join key using a reference to the data source worksheet metadata in the request; determining (406) an additional column from the two data source tables to add to the referencing worksheet, wherein the additional column is excluded from the data source worksheet; and creating (408), using the data source worksheet metadata and the join key, the referencing worksheet presenting the columns from the two data source tables with the additional column including: generating (410) a database query (422) using the data source worksheet metadata, referencing worksheet metadata received in the request, and the join key; and issuing (412) the database query (422) to the database (206).

The method of FIG. 5 differs from the method of FIG. 4, however, in that determining (406) an additional column from the two data source tables to add to the referencing worksheet, wherein the additional column is excluded from the data source worksheet includes accessing (502) a group of columns excluded from the data source worksheet; and receiving (504) a user selection of the additional column from the group of columns excluded from the data source worksheet.

Accessing (502) a group of columns excluded from the data source worksheet may be carried out by the linking module (126) retrieving a list of the group of columns from each of the two tables on the database. The list may be stored on the linking module computing system. Alternatively, the linking module (126) may issue a database query to the database to retrieve the list of the group of columns from each of the two tables on the database. The list of the group of columns may then be filtered based on the columns presented in the data source worksheet.

Accessing (502) a group of columns excluded from the data source worksheet may also be carried out by filtering the group of columns excluded from the data source worksheet based on other user selections during creations of other referencing worksheets linked from the data source worksheet. Specifically, the linking module (126) may maintain information about each referencing worksheet linked from the data source worksheet and present the group of columns excluded from the data source worksheet based on column frequently joined in other referencing worksheets. For example, the group of columns excluded from the data source worksheet may be arranged in order of most to least number of times the column has been joined in other referencing worksheets linked from the same data source worksheet.

Receiving (504) a user selection of the additional column from the group of columns excluded from the data source worksheet may be carried out by the linking module (126) detecting that a user has selected at least one additional column from the group of columns. The selection may be received via the GUI on the client computing system.

Alternatively, the linking module (126) may automatically, without user intervention, determine at least one additional column to join to the referencing worksheet. The linking module (126) may add the additional column based on a policy, such joining the most frequently used column from the tables, joining the column most frequently joined in other referencing worksheets, or joining each column that appears in both tables on the database.

Figure 6:
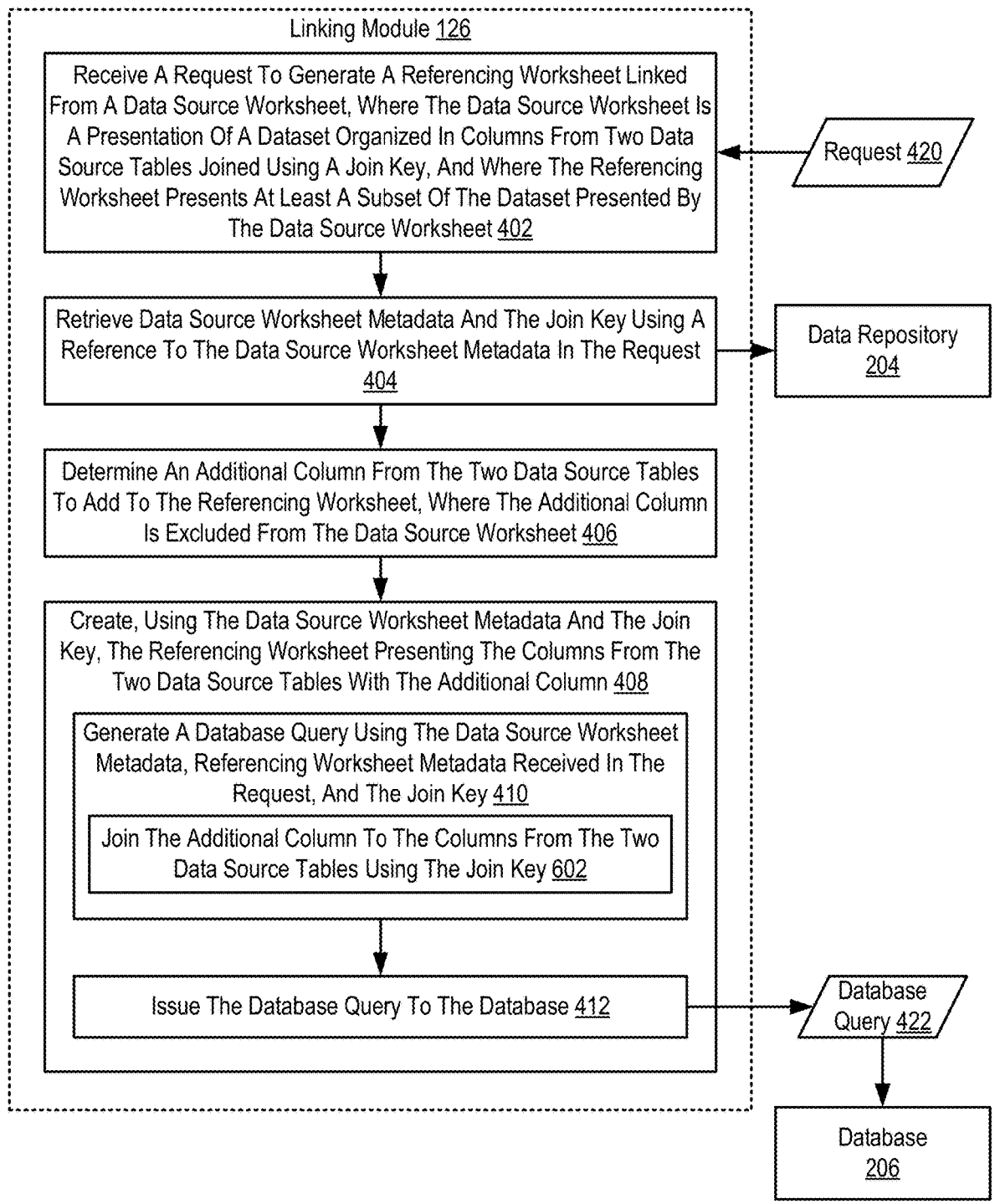
FIG. 6 sets forth a flow chart illustrating an exemplary method for join key propagation according to embodiments of the present invention.

For further explanation, FIG. 6 sets forth a flow chart illustrating a further exemplary method for join key propagation according to embodiments of the present invention that includes receiving (402) a request (420) to generate a referencing worksheet linked from a data source worksheet, wherein the data source worksheet is a presentation of a data set organized in columns from two data source tables joined using a join key, and wherein the referencing worksheet presents at least a subset of the data set presented by the data source worksheet; retrieving (404) data source worksheet metadata and the join key using a reference to the data source worksheet metadata in the request; determining (406) an additional column from the two data source tables to add to the referencing worksheet, wherein the additional column is excluded from the data source worksheet; and creating (408), using the data source worksheet metadata and the join key, the referencing worksheet presenting the columns from the two data source tables with the additional column including: generating (410) a database query (422) using the data source worksheet metadata, referencing worksheet metadata received in the request, and the join key; and issuing (412) the database query (422) to the database (206).

The method of FIG. 6 differs from the method of FIG. 4, however, in that generating (410) a database query (422) using the data source worksheet metadata, referencing worksheet metadata received in the request, and the join key includes joining (602) the additional column to the columns from the two data source tables using the join key. Joining (602) the additional column to the columns from the two data source tables using the join key may be carried out by the linking module (126) inserting query language into the database query to use the join key to link the additional column to the columns in the data source worksheet to create the referencing worksheet.

Figure 7:
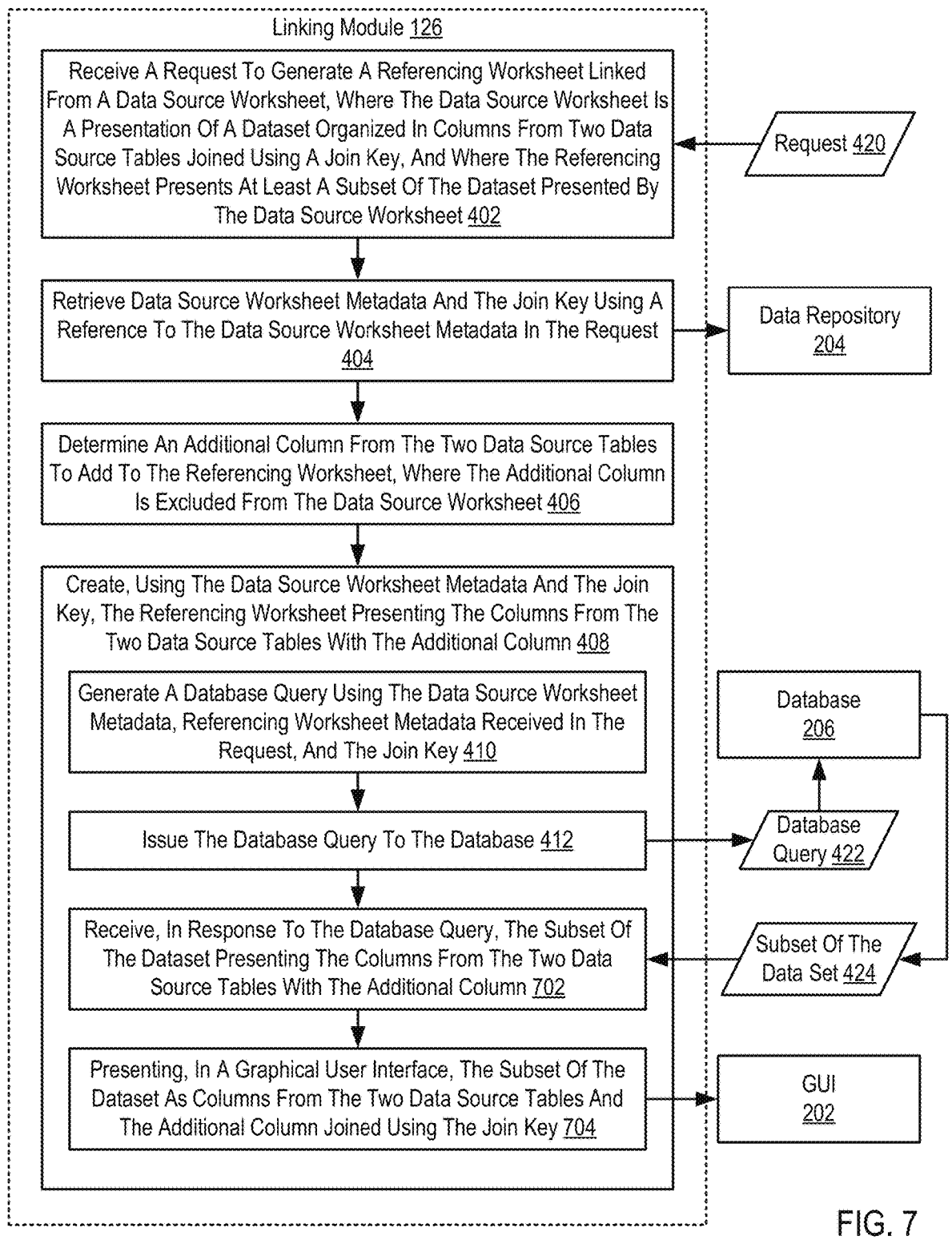
FIG. 7 sets forth a flow chart illustrating an exemplary method for join key propagation according to embodiments of the present invention.

For further explanation, FIG. 7 sets forth a flow chart illustrating a further exemplary method for join key propagation according to embodiments of the present invention that includes receiving (402) a request (420) to generate a referencing worksheet linked from a data source worksheet, wherein the data source worksheet is a presentation of a data set organized in columns from two data source tables joined using a join key, and wherein the referencing worksheet presents at least a subset of the data set presented by the data source worksheet; retrieving (404) data source worksheet metadata and the join key using a reference to the data source worksheet metadata in the request; determining (406) an additional column from the two data source tables to add to the referencing worksheet, wherein the additional column is excluded from the data source worksheet; and creating (408), using the data source worksheet metadata and the join key, the referencing worksheet presenting the columns from the two data source tables with the additional column including: generating (410) a database query (422) using the data source worksheet metadata, referencing worksheet metadata received in the request, and the join key; and issuing (412) the database query (422) to the database (206).

The method of FIG. 7 differs from the method of FIG. 4, however, in that the method of FIG. 7 further includes receiving (702), in response to the database query (422), the subset of the data set (424) presenting the columns from the two data source tables with the additional column; and presenting (704), in a graphical user interface (202), the subset of the data set (424) as columns from the two data source tables and the additional column joined using the join key.

Receiving (702), in response to the database query (422), the subset of the data set (424) presenting the columns from the two data source tables with the additional column may be carried out by the linking module (126) obtaining the subset of the data set (424) from the database in response to the database query (422). Presenting (704), in a graphical user interface (202), the subset of the data set (424) as columns from the two data source tables and the additional column joined using the join key may be carried out by the linking module (126) generating the referencing worksheet from the referencing worksheet metadata and received subset of the data set (424). Presenting the subset of the data set (424) may include applying any presentation structures from the data source worksheet metadata or the request (420).

In view of the explanations set forth above, readers will recognize that the benefits of join key propagation according to embodiments of the present invention include:
- Improving the operation of a computing system by locally preserving join keys used in data source worksheets for use in referencing worksheets, increasing computing system usability and functionality.
- Improving the operation of a computing system by storing join keys separately from the database, allowing non-administrators to create and reuse join keys, increasing computing system usability and functionality.

Exemplary embodiments of the present invention are described largely in the context of a fully functional computer system for join key propagation. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of join key propagation, the method comprising:
   receiving a request to generate a referencing worksheet linked from a data source worksheet, wherein the data source worksheet is a presentation of a data set organized in columns from two data source tables joined using a join key, and wherein the referencing worksheet presents at least a subset of the data set presented by the data source worksheet;
   retrieving data source worksheet metadata and the join key using a reference to the data source worksheet metadata in the request;
   determining an additional column from the two data source tables to add to the referencing worksheet, wherein the additional column is excluded from the data source worksheet; and
   creating, using the data source worksheet metadata and the join key, the referencing worksheet presenting the columns from the two data source tables with the additional column, wherein creating the referencing worksheet comprises:
      generating a database query using the data source worksheet metadata, referencing worksheet metadata received in the request, and the join key; and
      issuing the database query to the database.

2. The method of claim 1, wherein determining the additional column from the two data source tables to add to the referencing worksheet comprises:
   accessing a group of columns excluded from the data source worksheet; and
   receiving a user selection of the additional column from the group of columns excluded from the data source worksheet.

3. The method of claim 2, wherein accessing the group of columns excluded from the data source worksheet comprises filtering the group of columns excluded from the data source worksheet based on other user selections during creations of other referencing worksheets linked from the data source worksheet.

4. The method of claim 1, wherein generating the database query using the data source worksheet metadata, referencing worksheet metadata received in the request, and the join key comprises joining the additional column to the columns from the two data source tables using the join key.

5. The method of claim 1, wherein the data set of the data source worksheet excludes values used in the join key.

6. The method of claim 1, wherein the join key is defined during generation of the data source worksheet.

7. The method of claim 1, wherein creating the referencing worksheet further comprises:
   receiving, in response to the database query, the subset of the data set presenting the columns from the two data source tables with the additional column; and
   presenting, in a graphical user interface, the subset of the data set as columns from the two data source tables and the additional column joined using the join key.

8. An apparatus for join key propagation, the apparatus comprising a computer processor, a computer memory operatively coupled to the computer processor, the computer memory having disposed within it computer program instructions that, when executed by the computer processor, cause the apparatus to carry out the steps of:
   receiving a request to generate a referencing worksheet linked from a data source worksheet, wherein the data source worksheet is a presentation of a data set organized in columns from two data source tables joined using a join key, and wherein the referencing worksheet presents at least a subset of the data set presented by the data source worksheet;
   retrieving data source worksheet metadata and the join key using a reference to the data source worksheet metadata in the request;
   determining an additional column from the two data source tables to add to the referencing worksheet, wherein the additional column is excluded from the data source worksheet; and
   creating, using the data source worksheet metadata and the join key, the referencing worksheet presenting the columns from the two data source tables with the additional column, wherein creating the referencing worksheet comprises:
    generating a database query using the data source worksheet metadata, referencing worksheet metadata received in the request, and the join key; and
    issuing the database query to the database.

9. The apparatus of claim 8, wherein determining the additional column from the two data source tables to add to the referencing worksheet comprises:
    accessing a group of columns excluded from the data source worksheet; and receiving a user selection of the additional column from the group of columns excluded from the data source worksheet.

10. The apparatus of claim 9, wherein accessing the group of columns excluded from the data source worksheet comprises filtering the group of columns excluded from the data source worksheet based on other user selections during creations of other referencing worksheets linked from the data source worksheet.

11. The apparatus of claim 8, wherein generating the database query using the data source worksheet metadata, referencing worksheet metadata received in the request, and the join key comprises joining the additional column to the columns from the two data source tables using the join key.

12. The apparatus of claim 8, wherein the data set of the data source worksheet excludes values used in the join key.

13. The apparatus of claim 8, wherein the join key is defined during generation of the data source worksheet.

14. The apparatus of claim 8, wherein creating the referencing worksheet further comprises:
    receiving, in response to the database query, the subset of the data set presenting the columns from the two data source tables with the additional column; and
    presenting, in a graphical user interface, the subset of the data set as columns from the two data source tables and the additional column joined using the join key.

15. A computer program product for join key propagation, the computer program product disposed upon a non-transitory computer readable medium, the computer program product comprising computer program instructions that, when executed, cause a computer to carry out the steps of:
    receiving a request to generate a referencing worksheet linked from a data source worksheet, wherein the data source worksheet is a presentation of a data set organized in columns from two data source tables joined using a join key, and wherein the referencing worksheet presents at least a subset of the data set presented by the data source worksheet;
    retrieving data source worksheet metadata and the join key using a reference to the data source worksheet metadata in the request;
    determining an additional column from the two data source tables to add to the referencing worksheet, wherein the additional column is excluded from the data source worksheet; and
    creating, using the data source worksheet metadata and the join key, the referencing worksheet presenting the columns from the two data source tables with the additional column, wherein creating the referencing worksheet comprises:
        generating a database query using the data source worksheet metadata, referencing worksheet metadata received in the request, and the join key; and
        issuing the database query to the database.

16. The computer program product of claim 15, wherein determining the additional column from the two data source tables to add to the referencing worksheet comprises:
    accessing a group of columns excluded from the data source worksheet; and receiving a user selection of the additional column from the group of columns excluded from the data source worksheet.

17. The computer program product of claim 16, wherein accessing the group of columns excluded from the data source worksheet comprises filtering the group of columns excluded from the data source worksheet based on other user selections during creations of other referencing worksheets linked from the data source worksheet.

18. The computer program product of claim 15, wherein generating the database query using the data source worksheet metadata, referencing worksheet metadata received in the request, and the join key comprises joining the additional column to the columns from the two data source tables using the join key.

19. The computer program product of claim 15, wherein the data set of the data source worksheet excludes values used in the join key.

20. The computer program product of claim 15, wherein the join key is defined during generation of the data source worksheet.

* * * * *